US012625681B2

(12) United States Patent (10) Patent No.: US 12,625,681 B2
Volyn et al. (45) Date of Patent: May 12, 2026

(54) SERIALIZING AND DESERIALIZING MIXED REALITY EXPERIENCES OR PORTIONS THEREOF

(71) Applicant: simpleAR, Inc., Irvine, CA (US)

(72) Inventors: Julian Volyn, Long Valley, NJ (US);
Michael Davis, Yorba Linda, CA (US);
TJ Southard, Newport, NC (US);
Phillip Do, Chandler, AZ (US); Josh Zavaleta, Aliso Viejo, CA (US); James Williams, Anaheim, CA (US); Marlo Brooke, Newport Coast, CA (US);
Scott Toppel, Virginia Beach, VA (US)

(73) Assignee: simpleAR, Inc., Irvine, CA (US)

( * ) Notice: Subject to any disclaimer, the term of this patent is extended or adjusted under 35 U.S.C. 154(b) by 317 days.

(21) Appl. No.: 18/583,362

(22) Filed: Feb. 21, 2024

(65) Prior Publication Data

US 2025/0036371 A1 Jan. 30, 2025

Related U.S. Application Data

(60) Provisional application No. 63/515,503, filed on Jul. 25, 2023.

(51) Int. Cl.
G06F 8/34 (2018.01)
G06T 7/20 (2017.01)
(Continued)

(52) U.S. Cl.
CPC .................. G06F 8/34 (2013.01); G06T 7/20 (2013.01); G06T 13/20 (2013.01); G06T 19/006 (2013.01)

(58) Field of Classification Search
CPC ... G06F 8/34; G06T 7/20; G06T 13/20; G06T 19/006
See application file for complete search history.

(56) References Cited

U.S. PATENT DOCUMENTS

2013/0247003 A1* 9/2013 Seth ........................ G06F 40/14
717/115
2015/0178292 A1* 6/2015 Nie ........................ G06F 16/116
707/756
(Continued)

FOREIGN PATENT DOCUMENTS

JP 2022092745 A 6/2022
WO WO-2025006142 A1 * 1/2025 ............. G06F 9/451

OTHER PUBLICATIONS

International Search Report and Written Opinion, dated Nov. 4, 2024, for International Patent Application No. PCT/US2024/039356. (7 pages).

*Primary Examiner* — Ziaul A Chowdhury
(74) *Attorney, Agent, or Firm* — Seed Intellectual Property Law Group LLP

(57) ABSTRACT

A portion of a source mixed reality (MR) experience is retrieved. Then, the portion of the source MR experience is used to generate a serialized representation including a hierarchy of tagged elements. The hierarchy of tagged elements includes a plurality of MR step elements collectively defining a procedure to be performed by a viewer of an MR experience. Each MR step element has child elements that include an MR step number indicating a position of the MR step in the MR procedure and an MR step ID element indicating an identity of the MR step. The serialized representation is deserialized to generate a portion of a target MR experience to be edited in an MR development tool. The portion of the target MR experience is usable to cause each MR step in the plurality of MR steps to be graphically represented in the MR development tool.

15 Claims, 10 Drawing Sheets

(51) Int. Cl.
    *G06T 13/20*      (2011.01)
    *G06T 19/00*      (2011.01)

(56)           References Cited

U.S. PATENT DOCUMENTS

| | | |
|---|---|---|
| 2018/0095635 A1 | 4/2018 | Valdivia et al. |
| 2019/0272184 A1* | 9/2019 | Rubenfield ........... G06T 19/006 |
| 2020/0051334 A1* | 2/2020 | Leung ...................... G06T 7/73 |
| 2020/0357187 A1 | 11/2020 | Drouin et al. |
| 2022/0083198 A1 | 3/2022 | Kaehler et al. |
| 2023/0033874 A1 | 2/2023 | Wen et al. |

* cited by examiner

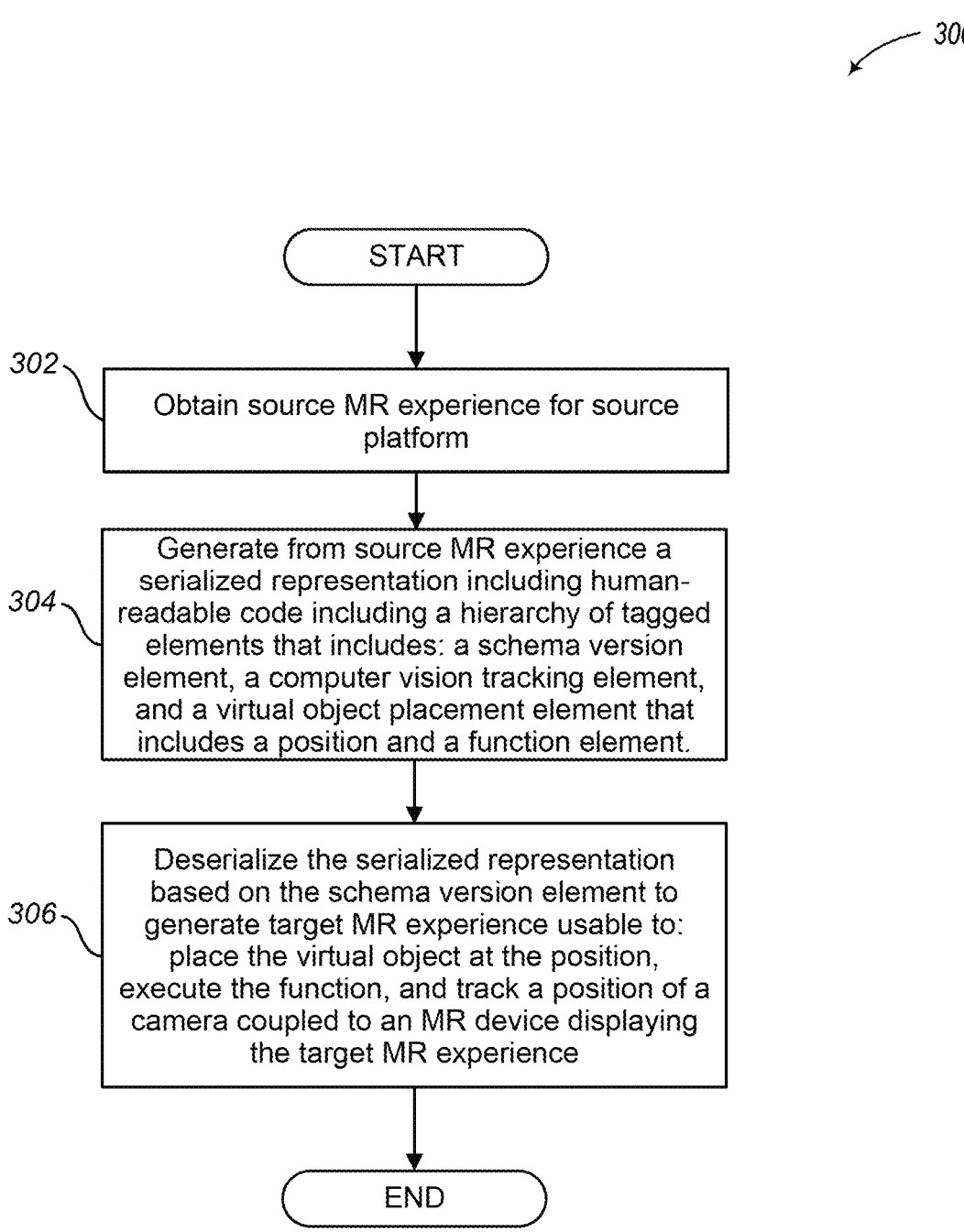

_300_

START

302 — Obtain source MR experience for source platform

304 — Generate from source MR experience a serialized representation including human-readable code including a hierarchy of tagged elements that includes: a schema version element, a computer vision tracking element, and a virtual object placement element that includes a position and a function element.

306 — Deserialize the serialized representation based on the schema version element to generate target MR experience usable to: place the virtual object at the position, execute the function, and track a position of a camera coupled to an MR device displaying the target MR experience

END

Fig. 3

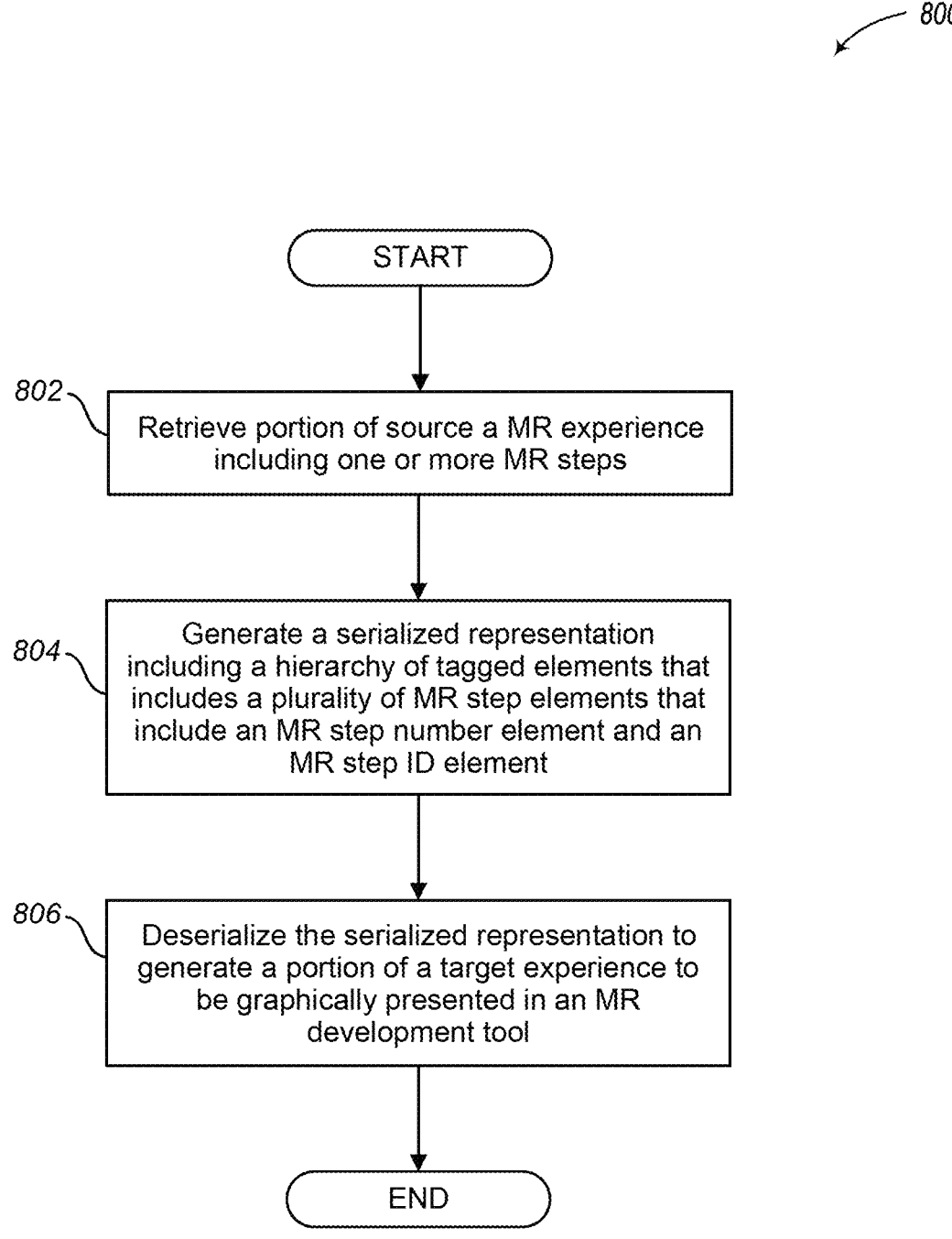

*800*

START

802 — Retrieve portion of source a MR experience including one or more MR steps

804 — Generate a serialized representation including a hierarchy of tagged elements that includes a plurality of MR step elements that include an MR step number element and an MR step ID element 806 — Deserialize the serialized representation to generate a portion of a target experience to be graphically presented in an MR development tool

END

SERIALIZING AND DESERIALIZING MIXED REALITY EXPERIENCES OR PORTIONS THEREOF

CROSS-REFERENCE TO RELATED APPLICATIONS

This application claims the benefit of U.S. App. No. 63/515,503, filed Jul. 25, 2023, and entitled "CONVERTING OR GENERATING IMRSA STANDARD TAGGED AUGMENTED REALITY EXPERIENCE," which is hereby incorporated by reference in its entirety.

In cases where the present application conflicts with a document incorporated by reference, the present application controls.

BACKGROUND

Mixed reality (MR) experiences typically include performance of certain core functionalities, including establishing pose and tracking pose such that virtual artifacts are properly displayed with respect to features in a physical environment around a viewer.

BRIEF DESCRIPTION OF THE DRAWINGS

FIG. 3 is a flow diagram showing a process used by the facility in some embodiments to serialize and deserialize a mixed reality experience.

FIG. 8 is a flow diagram showing a process used by the facility in some embodiments to serialize and deserialize a mixed reality experience having MR steps.

DETAILED DESCRIPTION

Figure 1:
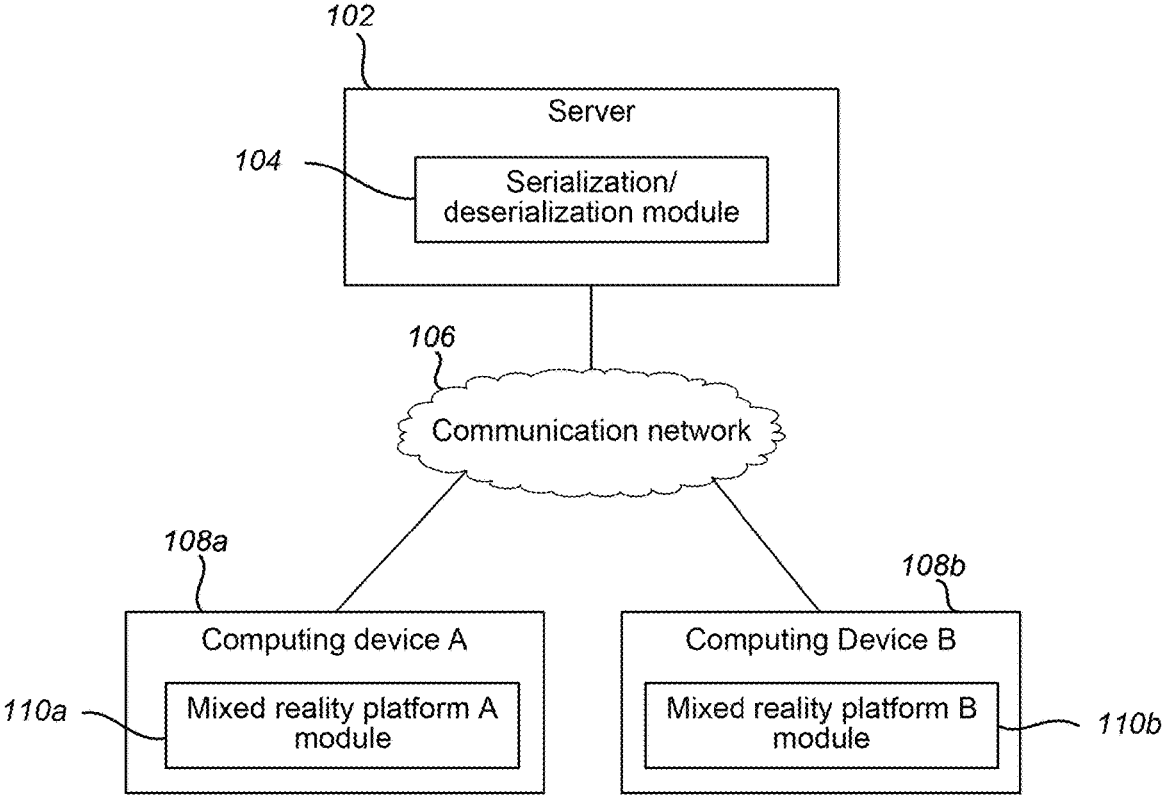
FIG. 1 is a network diagram showing an environment in which the facility operates.

Mixed reality experiences developed and deployed across a variety of platforms using conventional techniques suffer from a lack of portability. Despite performing common core functionalities, functionality of a mixed reality experience is often not portable to other mixed reality experiences or mixed reality platforms.

The inventors have recognized that conventional techniques for reusing functionality between mixed reality experiences and platforms are often unsatisfactory. A developer might create a mixed reality experience or a portion thereof for a platform. For example, assets for camera tracking or controlling object behavior are developed. These assets may be useful on other mixed reality platforms. But manually porting software from the first platform to another platform is often the only option for reusing mixed reality assets across platforms. Manual porting generally involves a developer attempting to manually recreate similar functionality on a different platform. Manually porting a mixed reality experience from one platform to another platform is often a laborious and error-prone task requiring significant developer time and computing resources. This limits the number of mixed reality experiences that can be developed and inhibits deploying mixed reality experiences across various platforms.

In response to recognizing these disadvantages, the inventors have conceived and reduced to practice a software and/or hardware facility for serializing and deserializing mixed reality (MR) experiences or portions thereof ("the facility").

The facility provides for serializing and deserializing mixed reality experiences or portions thereof. First, the facility receives a source MR experience for a source platform. Then the facility uses the schema to generate, based on the source MR experience, a serialized representation including human-readable code. The human-readable code includes a hierarchy of tagged elements that includes a version indicator and a type of computer vision tracking to be used in an MR experience. The hierarchy of tagged elements further includes an indication of a virtual object, the indication including a position relative to an origin in the MR experience at which to place the virtual object and a function to be applied to the MR experience in response to the placement. The facility then generates, based on the serialized representation and the version indicator, a target MR experience to be executed using a target platform. The target MR experience is usable to place the virtual object at the position relative to the origin, execute the function in response to the placement, and track, by the type of computer vision tracking, a position relative to the origin of a camera coupled to an MR device displaying the MR experience.

By performing in some or all of the ways described above, the facility improves portability of mixed reality experience assets between experiences and platforms. Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by increasing the portability of mixed reality assets, the facility conserves computing resources such as computing cycles that would otherwise be used to support graphical user interfaces for a developer to recreate or manually port the mixed reality assets. Furthermore, increasing the portability of mixed reality assets reduces the number of unique assets that are stored to execute a mixed reality experience-thus reducing total storage space consumed-by allowing assets created for one mixed reality experience to be deployed across many mixed reality experiences and platforms. The conserved computing resources can then be deployed for other tasks, improving the functioning of computers.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc.

FIG. 1 is a network diagram showing an environment 100 in which the facility operates. In the example shown in FIG. 1, environment 100 includes server 102, computing device A 108*a*, and computing device B 108*b*. Server 102 includes serialization/deserialization module 104 for serializing and deserializing mixed reality experiences. In an example embodiment, server 102 receives via communication network 106 a mixed reality experience configured to be executed using mixed reality platform A module 110*a*. Server 102 uses serialization/deserialization module 104 to serialize the mixed reality experience. Then, server 102 uses serialization/deserialization module 104 to deserialize the serialized mixed reality experience into a mixed reality experience configured to be executed using mixed reality platform B module 110*b* and transmits the deserialized mixed reality experience to computing device B 108*b*. In various embodiments, deserializing or serializing may be performed on any of server 102, computing device A 108*a*, or computing device B 108*b*.

Figure 2:
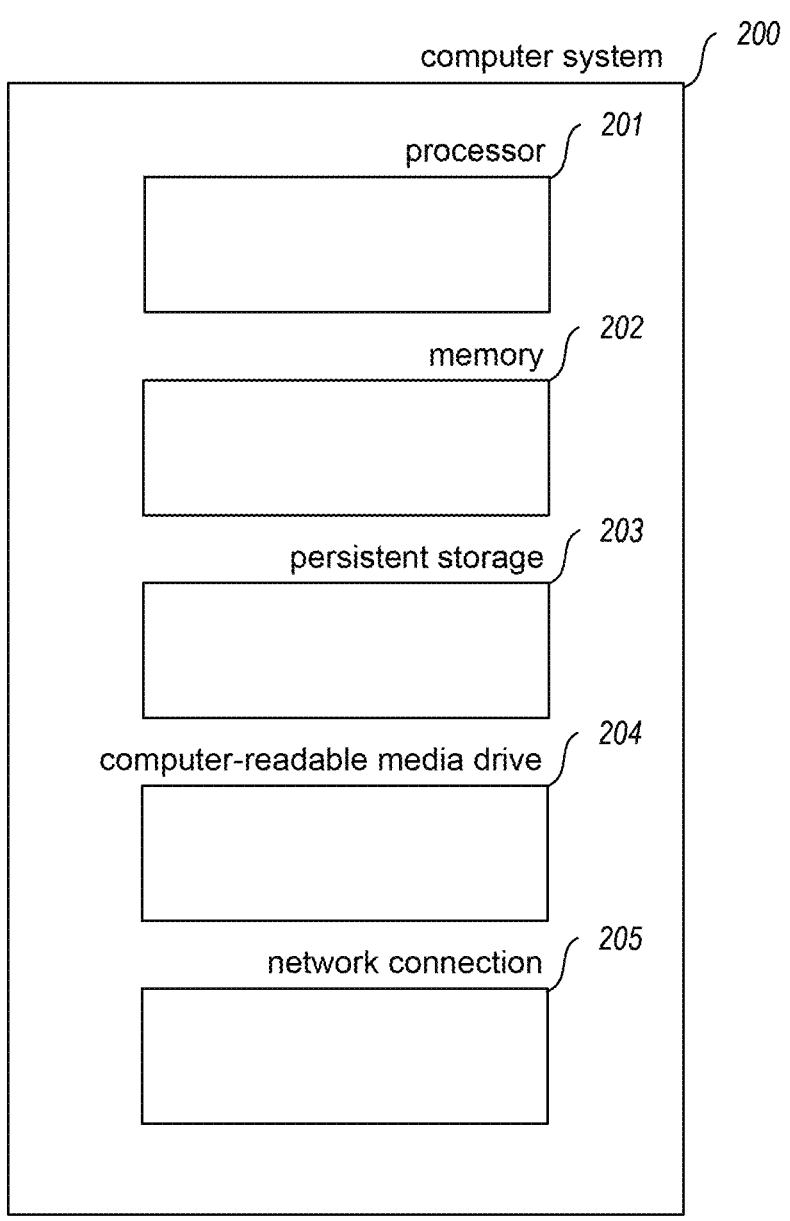
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202—such as RAM, SDRAM, ROM, PROM, etc. —for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 2 and discussed above constitutes a data signal per se. While computer systems configured as described above are typically used to support the operation of the facility, those skilled in the art will appreciate that the facility may be implemented using devices of various types and configurations and having various components.

FIG. 3 is a flow diagram showing a process 300 used by the facility in some embodiments to serialize and deserialize a mixed reality experience.

At block 302, the facility obtains a source mixed reality experience configured to be executed using a source platform. In various embodiments, the source MR experience is a portion of an MR experience that is not usable alone to display an MR experience. In some embodiments, the source MR experience is one or more functions to be used in an MR experience. For example, MR experiences typically require a function to track a position of a camera with respect to a mixed reality environment; in some embodiments, the source MR experience includes the function to track the position of the camera. In some embodiments, the source MR experience is a complete MR experience that is usable to display a mixed reality experience upon execution using the source platform. In various embodiments, the source MR experience includes a representation of a node graph that includes nodes that represent MR steps in an MR procedure. In an example embodiment, an MR procedure includes a plurality of MR steps collectively demonstrating or describing a procedure to be performed by a viewer of the MR experience. After block 302, process 300 proceeds to block 304.

At block 304, the facility generates from the source mixed reality experience a serialized representation including human-readable code that includes a hierarchy of tagged elements. The hierarchy of tagged elements includes a schema version element, computer vision tracking element, and a virtual object placement element that includes a position element and a function element. These elements are discussed with respect to FIGS. 4, 5, 6, and 7.

In some embodiments, the serialized representation is generated using a mapping from the format of the source experience to a format of the serialized representation. For example, an element in the source MR experience is mapped to an element in the serialized representation according to the mapping. In various embodiments, elements of the source MR experience to be mapped to the serialized representation are identified by parsing the source MR experience to determine elements that appear in the mapping. In some embodiments, serialization is performed using a serializer implementing schema described herein. For example, the serializer may identify elements in the source MR experience that correspond to elements in the schema and generate a serialized representation of the source MR experience according to the schema.

In various embodiments, the serializer for generating the serialized representation is defined for each source format in a plurality of source formats. In some embodiments, the serializer is automatically generated by an artificial intelligence model. In an example embodiment, a prompt for a large language model (LLM) is constructed using an example serializer, the schema, and the source mixed reality experience. In some embodiments, the example serializer implements a second schema. In some embodiments, the prompt includes a concatenation of the example serializer implementing the second schema, the schema, and the source mixed reality experience. In some embodiments, the schema is used to serialize a mixed reality experience to be executed using a different platform than the platform of the source mixed reality experience. The facility provides the prompt to the LLM and receives the serializer from the LLM in response.

In some embodiments, not every element of the human-readable code is human-readable. In an example embodiment, tags are human-readable and one or more tagged values are hexadecimal values, binary objects, etc. In general, the term "human-readable" refers to the hierarchy of tagged elements being perceptible to a human, natural language words appearing in the hierarchy of tagged elements, etc. In some embodiments, the hierarchy of tagged elements is compiled or converted into a machine-readable format.

In some embodiments, the serialized representation is packaged with media assets that the serialized representation references. In various embodiments, the serialized representation includes a reference to a 3D animation, audiovisual content, or other media assets. In some embodiments, the packaging is performed by including a reference to the media assets such as a uniform resource locator (URL) or other reference that indicates a location of the media assets. In some embodiments, the media assets themselves are packaged with the serialized representation in compressed or uncompressed form.

Figure 4:
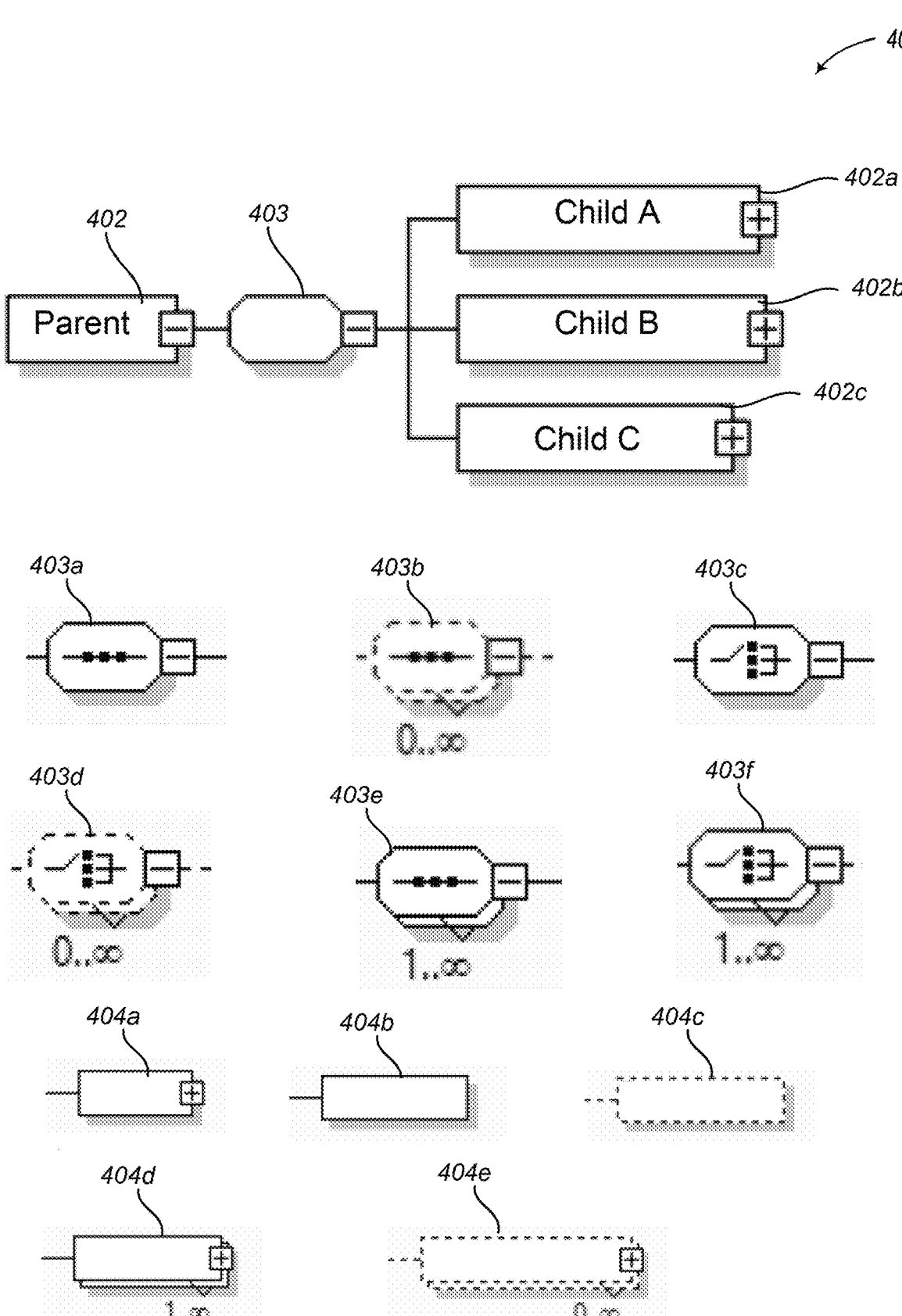
FIG. 4 is a schema key diagram showing schema notation used to denote characteristics of elements in schema depicted herein.

FIG. 4 is a schema key diagram showing schema notation 400 used to denote relationships between elements in schema depicted herein. In the example shown in FIG. 4, connector 403 defines a relationship between parent element 402 and child elements child A 402a, child B 402b, and child C 402c. In general, schema depicted herein follow a similar structure, wherein a parent element appears to the left of a connector that defines a relationship between the parent and one or more child elements to the right of the connector. Connector 403 denotes a relationship between parent element 402 and its child elements. For example, a first connector type indicates that for each instance of parent element 402, one instance of each child element is expected. In another example, a second connector type indicates that for each instance of parent element 402 a single child element is expected. Elements having solid lines are expected for each instance of their respective parent element, while elements having dashed lines are optionally expected for each instance of their respective parent element.

Connectors 403a, 403b, 403c, 403d, 403e, and 403f each denote a specific relationship between a parent element and one or more child elements. Sequence of branches connector 403a indicates that zero or more of each child element depicted in the schema is expected to be present in the order depicted for each instance of the parent element. For example, when connector 403 is sequence of branches connector 403a, child A 402a, child B 402b, and child C 402c are each expected to be present in that order. Child elements with dashed lines appearing with sequence of branches connector 403a are optional but are to appear in the order depicted if present. Optional and repeatable sequence of branches connector 403b indicates that each child element depicted in the schema are to be, if present, in the order depicted for each of zero or more instances of the parent element. Choice of branches connector 403c indicates that one of the child elements depicted in the schema is expected for each instance of the parent element. Optional and repeatable choice of branches connector 403d indicates that zero or more of the child elements depicted in the schema may be present for each of zero or more instances of the parent element. Repeatable sequence of branches connectors 403e indicates that child elements present in the schema are expected to be present in the order depicted for each of one or more instances of the parent element. Repeatable choice of branches connector 403f indicates that one child element is expected for each of one or more instances of the parent element.

Element occurrence indicators indicate properties of elements appearing with the corresponding element occurrence indicator in a schema. Subelement indicator 404a includes a "plus" icon and indicates that the contained element has one or more subelements (i.e., child elements). Expected element indicator 404b includes solid borders and indicates that the contained element is expected to appear once in a schema. Optional element indicator 404c includes dashed borders and indicates that the contained element optionally appears once in a schema. Expected and repeatable indicator 404d includes solid borders and text "1 . . . ∞", indicating at least one instance of the contained element is expected in a schema. Optional and repeatable indicator 404e includes dashed borders and text "0 . . . ∞", indicating zero or more instances of the contained element are expected in a schema. In various embodiments, two or more indicators are combined to indicate the contained element follows each of two or more corresponding indicators. For example, expected and repeatable indicator 404d as shown in FIG. 4 also includes subelement indicator 404a (indicated by the "plus" icon) and therefore has subelements.

Figures 5A, 5B, 5C:
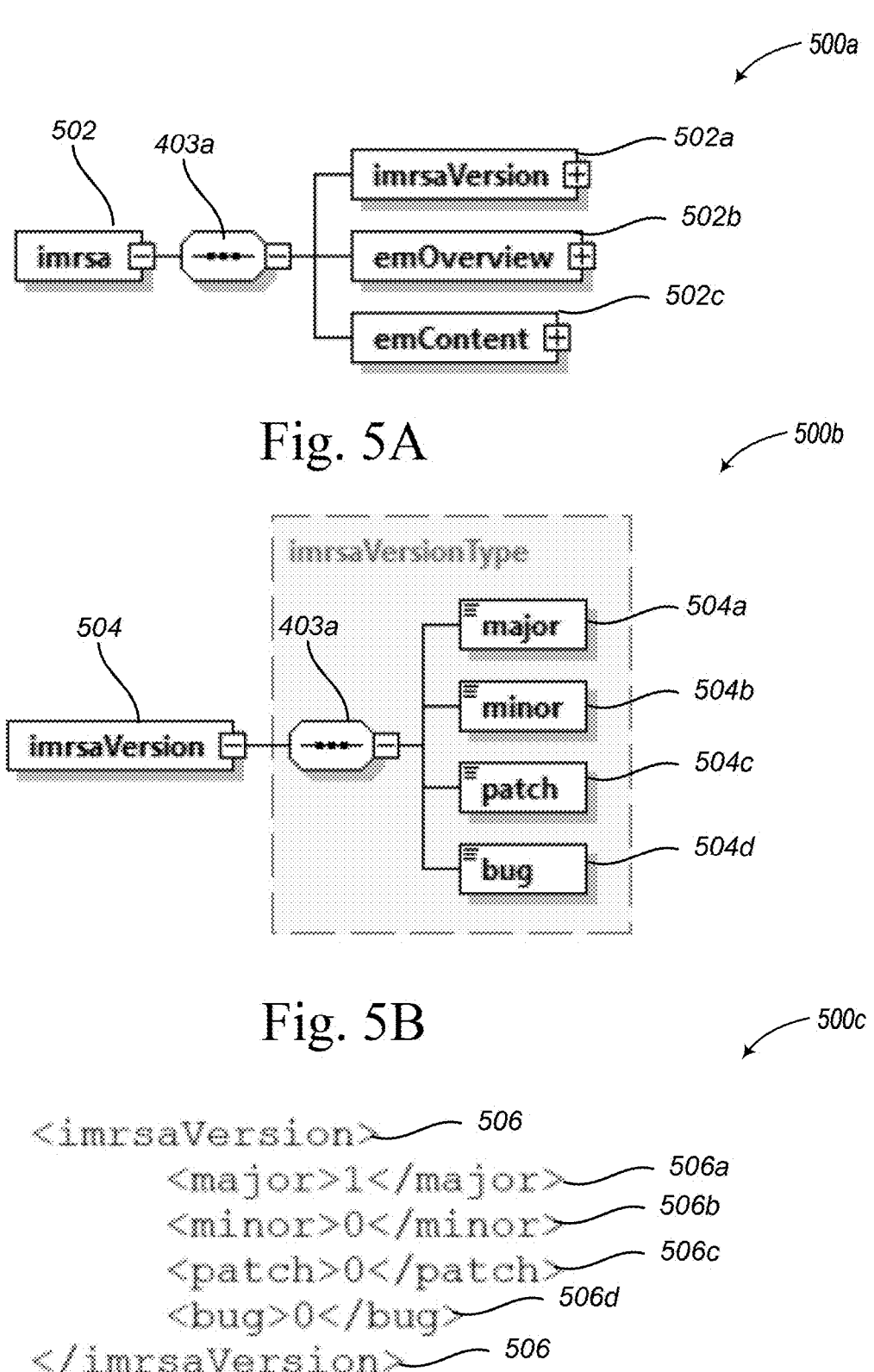
FIGS. 5A and 5B are schema diagrams showing schema used by the facility in some embodiments to serialize and deserialize vision tracking information for a mixed reality experience.
FIG. 5C is an excerpt of a serialized mixed reality experience according to the schema shown in FIG. 5B.

FIG. 5A is a schema diagram showing schema 500a used by the facility in some embodiments to serialize and deserialize version information for a mixed reality experience. Schema 500a shows relationships between tagged elements in the hierarchy of tagged elements. In some embodiments, schema 502 is connected by sequence of branches connector 403a to child elements schema version 502a, emOverview 502b, and emContent 502c. Sequence of branches connector 403a indicates that each child element is to be present in the hierarchy of tagged elements as child elements of schema element 502 and in the order depicted.

FIG. 5B is a schema diagram showing a schema 500b used by the facility in some embodiments to serialize and deserialize schema version element 504. Schema 500b defines a structure in a hierarchy of tagged elements that defines a schema version of a mixed reality experience. In various embodiments, schema version information is used to determine how to serialize or deserialize a mixed reality experience. In an example embodiment, different schema versions include different schema, features, etc., such that mixed reality experiences are serialized or deserialized differently depending on the schema version.

In some embodiments, schema version element 504 corresponds to schema version 502a. In some embodiments, schema version element 504 includes child elements major element 504a, minor element 504b, patch element 504c, and bug element 504d and is connected to child elements by sequence of branches connector 403a, indicating that each child is expected in the order depicted. In various embodiments, major element 504a indicates a major version of the schema, minor element 504b indicates a minor version of the schema, patch element 504c indicates a patch of the schema, and bug element 504d indicates a bug of the schema. Collectively, child elements 504a-504d define a version of the schema used in connection with the MR experience.

FIG. 5C illustrates an excerpt of a serialized MR experience 500c having tagged elements corresponding to the schema shown in FIG. 5B. Schema version 506 corresponds to schema version 504. Major 506a, minor 506b, patch 506c, and bug 506d correspond to major element 504a, minor element 504b, patch element 504c, and bug element 504d, respectively. In general, each schema may be represented as a hierarchy of tagged elements as in FIG. 5C, but the tagged element representations of other schema discussed herein are omitted for brevity.

As shown in FIG. 5C, a tagged element such as major element 506a may be associated with a value. In the example shown in FIG. 5C, major element 506a is associated with a value of 0. In various embodiments, the source MR experience lacks one or more values corresponding to a tagged element. In various embodiments, a default value such as 0, null, etc., is used when a value is missing.

Figure 6A:
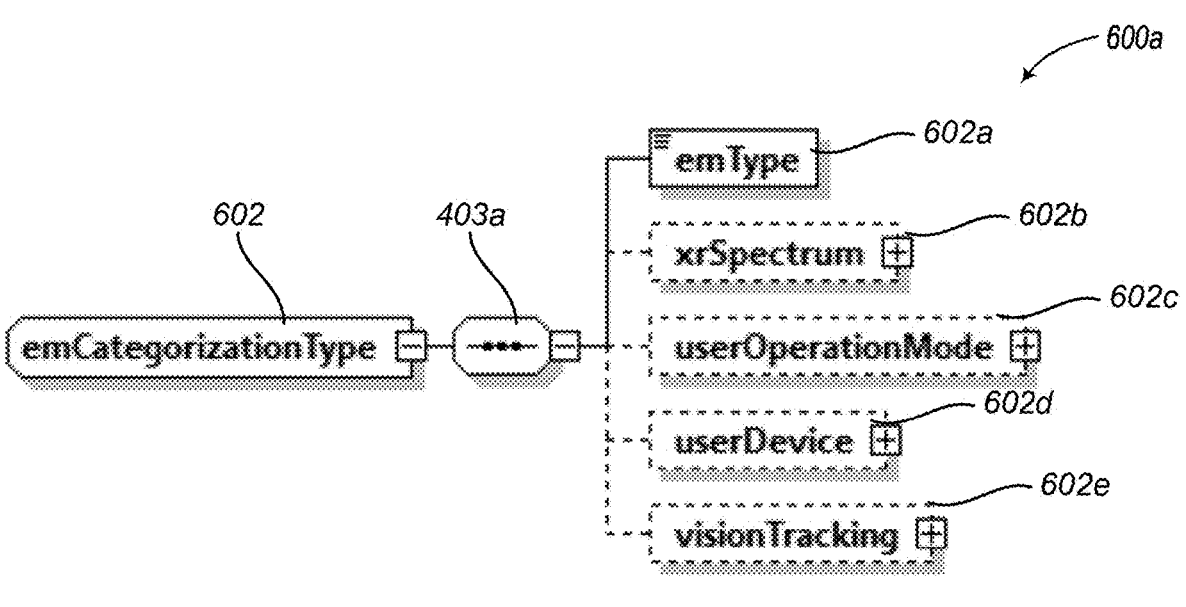
FIGS. 6A, 6B, and 6C are schema diagrams showing schema used by the facility in some embodiments to serialize and deserialize various functionality for a mixed reality experience.

FIG. 6A is a schema diagram showing schema 600a used by the facility in some embodiments to define category properties for an MR experience. Sequence of branches connector 403a establishes that for each instance of emCategorizationType 602, emType element 602a is expected and zero or one of each of xrSpectrum element 602b, userOperationMode element 602c, userDevice element 602d, and visionTracking element 602e are expected in the order depicted in the schema if present.

EmType element 602a is an expected element that defines a tagged structure for defining a type of experience module. Elements 602b-602e are optional elements. xrSpectrum element 602b that defines a tagged structure for defining a target extended reality (XR) spectrum for the mixed reality experience.

userOperationMode element 602c defines an operation mode for the MR experience such as an open space, a real environment, or a closed space. userDevice element 602d defines target MR user devices to display the experience such as a head-mounted display, a tablet, or a phone. visionTracking element 602e defines a target type of computer vision tracking for the experience. In some embodiments, the facility uses vision Tracking element 602e to track a physical object to be displayed as coupled to a virtual object. For example, a physical table on which a virtual drone is to be displayed may be tracked to support display of the virtual drone.

Figure 6B:
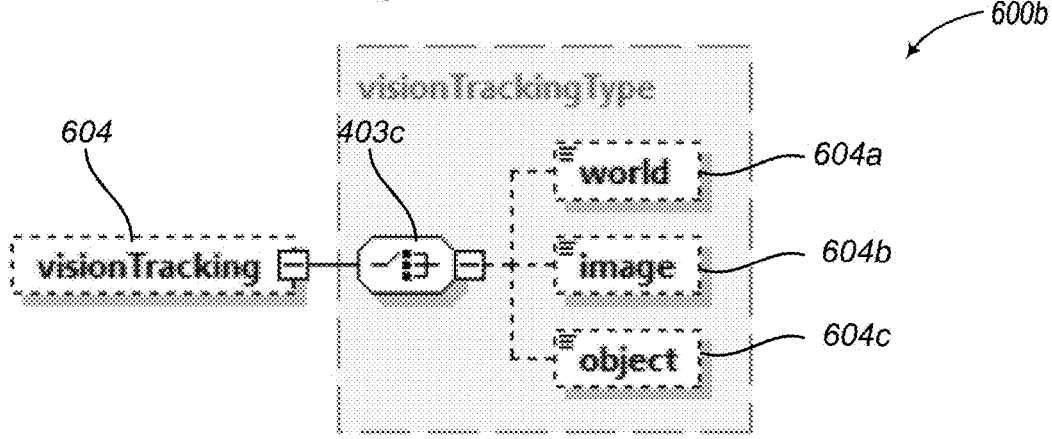

FIG. 6B is a schema diagram showing a schema 600b used by the facility in some embodiments to serialize and deserialize a target type of computer vision tracking for an experience. In various embodiments, a tagged structure according to schema 600b defines a relationship between visionTracking element 604 and world element 604a, image element 604b, or object element 604c using choice of branches connector 403c. Accordingly, for each instance of vision Tracking element, one instance of world element 604a, image element 604b, or object element 604c is expected.

Figure 6C:
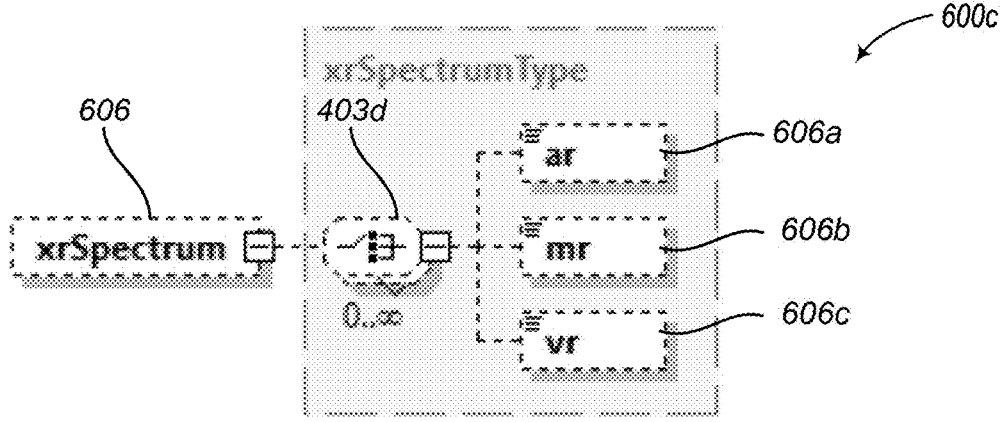

FIG. 6C is a schema diagram showing a schema 600c used by the facility in some embodiments to serialize and deserialize a target MR spectrum for an MR experience. The term "XR" encompasses augmented reality (AR), mixed reality (MR), and virtual reality (VR). XrSpectrum element 606 is connected to child elements AR element 606a, MR element 606b, and VR element 606c by optional and repeatable choice of branches connector 403d. For each instance of xrSpectrum element 606, one of elements 606a-606c may appear. Therefore, xrSpectrum element 606 provides a tagged structure for identifying whether the XR experience is an AR, MR, or VR experience. Depending upon the xrSpectrum element 606, different capabilities of a device displaying the experience are to be used to display the XR experience. For example, a typical augmented reality experience displays virtual artifacts overlaid on a physical environment using a gyroscope, accelerometer, magnetometer, or global position system. A typical mixed reality experience displays virtual artifacts mixed with a physical environment using visual inertial odometry (VIO) or simultaneous localization and mapping (SLAM). A typical virtual reality experience displays only virtual artifacts with full immersion and no physical environment visible to the user.

As used herein, the term "mixed reality" or "MR" may be used interchangeably with the terms "extended Reality" or XR, "augmented reality" or "AR," "virtual reality" or "VR." While embodiments described herein are discussed in terms of mixed reality, various embodiments are directed to AR, MR, or VR experiences.

Figures 7A, 7B, 7C:
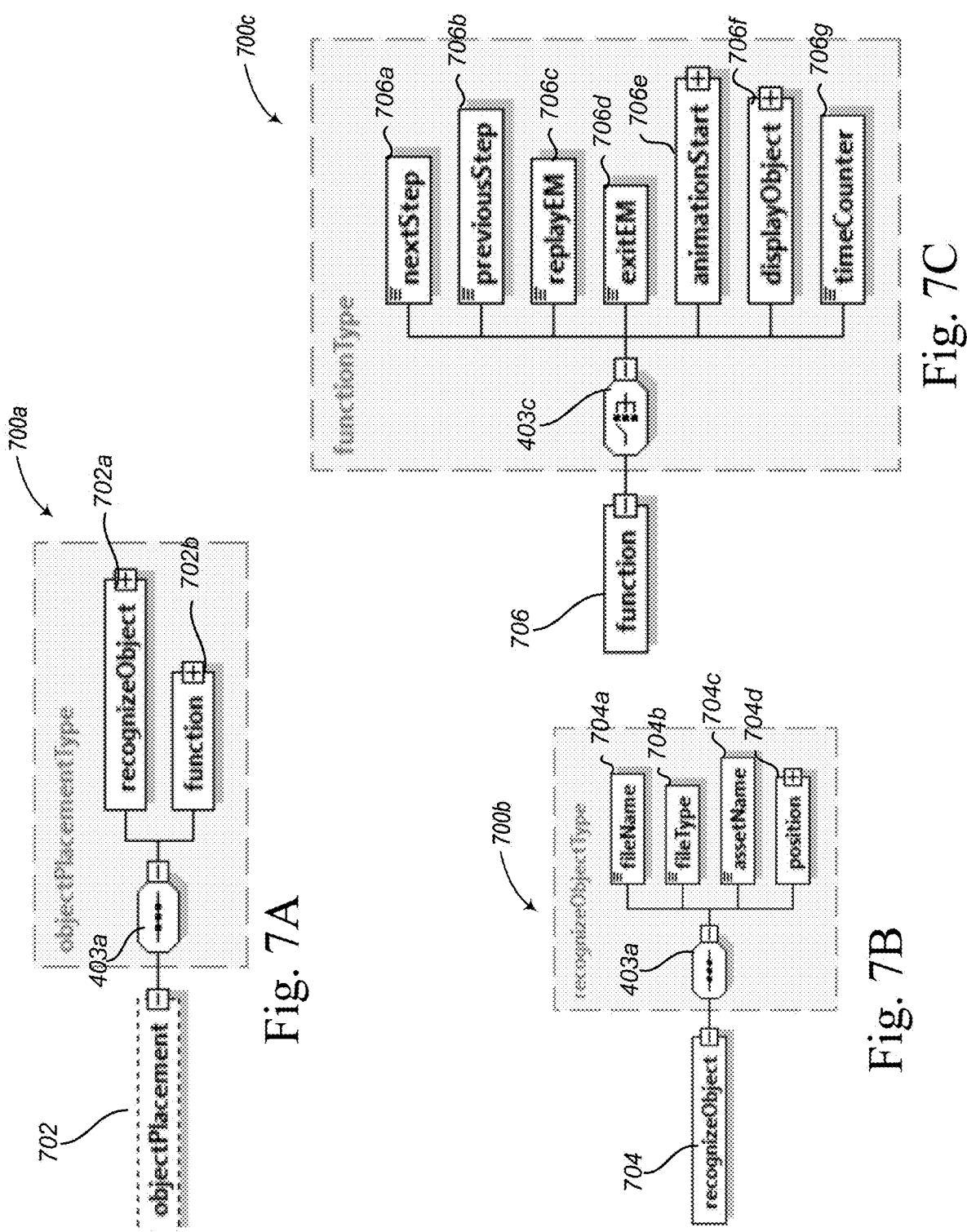
FIGS. 7A, 7B, and 7C are schema diagrams showing schema used by the facility in some embodiments to serialize and deserialize various functionality for a mixed reality experience.

FIGS. 7A, 7B, and 7C illustrate schema 700a, schema 700b, and schema 700c, which show elements used by the facility in some embodiments to serialize and deserialize object placement information for a mixed reality experience.

FIG. 7A is a schema diagram showing schema 700a used by the facility in some embodiments to serialize and deserialize properties of an object placement interaction within an experience. In some embodiments, objectPlacement 702 is connected by sequence of branches connector 403a to recognizeObject 702a and function element 702b. recognizeObject 702a defines properties of a recognition object used to establish context for the MR experience within a physical environment of a user.

FIG. 7B is a schema diagram showing schema 700b used by the facility in some embodiments to serialize and deserialize a recognition object used to establish context for the MR experience within a physical environment of a user. In some embodiments, recognizeObject 704 is connected by sequence of branches connector 403a to filename element 704a, filetype element 704b, assetName 704c, and position 704d. In some embodiments, position 704d includes element defining an x position, y position, and z position of the object with respect to an origin in the MR experience.

FIG. 7C is a schema diagram showing a schema 700c used by the facility in some embodiments to serialize and deserialize a function triggered by placement of an object. In some embodiments, function element 706 is connected by choice of branches connector 403c to elements nextStep 706a, previousStep 706b, replayEM 706c, exitEM 706d, animationStart 706e, displayObject 706f, and timeCounter 706g.

nextStep 706a executes going to a next step in an MR experience. previousStep 706b executes going to a previous step in the MR experience. replayEM 706c executes going to a starting step in the MR experience. exitEM 706d executes exiting the MR experience, while animationStart 706e defines elements to start a specified animation. displayObject 706f defines properties of the function used to display an object, and timeCounter 706g defines a number of seconds to elapse before executing a next function.

Returning to FIG. 3, after block 304, process 300 proceeds to block 306, where the facility deserializes the serialized representation based on the schema version element to generate a target mixed reality experience. The target MR experience can be executed using the target MR platform to place a virtual object at the position, execute the function, and track the position of a camera that is in communication with an MR device that is displaying the target MR experience.

In various embodiments, block 306 employs techniques similar to embodiments of block 304 to perform the deserialization, but the deserializer maps functions from the serialized representation to the target MR experience. In an example embodiment, the facility automatically creates a deserializer to generate the target MR experience from the serialized representation by providing a prompt that includes an example deserializer and the serialized representation to an LLM, which provides the deserializer in response. Then, the facility applies the deserializer to the serialized representation, yielding the target MR experience.

In some embodiments, the target MR experience is configured to be modified using an MR development tool that includes a graphical programming interface. In some embodiments, the target MR experience includes a functionality not included in the source MR experience. For example, the target MR experience supports a greater number of features of the serialized schema.

In some embodiments, the hierarchy of tagged elements includes a target MR devices element specifying compatible MR devices for the MR experience.

In some embodiments, the hierarchy of tagged elements includes a three-dimensional (3D) animation element specifying a 3D animation to apply to the virtual object. In various embodiments, the 3D animation element includes child elements including one or more of: a file name element, a file type element, a clip name element, an autoplay behavior element, or a loop behavior element. In some embodiments, the serialized representation is deserialized into a plurality of target MR experiences for a plurality of corresponding platforms. After block 306, process 300 ends at an end block.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 8 is a flow diagram showing a process 800 used by the facility in some embodiments to serialize and deserialize a portion of a mixed reality experience having MR steps.

At block 802, the facility retrieves a portion of a source MR experience including a plurality of MR steps. Often, a portion of a source MR experience is generated using a first platform and is modified using a second platform. For example, a template for an MR experience is produced using a first platform and the template is edited into a usable MR experience using a second platform. In another example, a portion of code used in the source MR experience implements functionality to be used in a target MR experience, but some or all of the remaining code will not be used in the target MR experience. Therefore, it is often advantageous to generate a target MR experience using a portion of a source MR experience.

In some embodiments, the portion of the source MR experience constitutes an entire MR experience that is incomplete in that it is not usable by itself to display an MR experience. For example, the source MR experience includes one or more functions but does not include all functionality to be implemented in an MR experience. In some embodiments, the source MR experience is a portion of a complete MR experience. In some embodiments, the portion of the source MR experience is usable to display an MR experience but is to be modified such that the target MR experience includes different functionality or features than the portion of the source MR experience. After block 802, process 800 proceeds to block 804.

The portion of the source MR experience includes one or more MR step elements. An MR step refers to a discrete portion of an MR experience that typically includes a change to the MR experience. For example, an MR step in various embodiments includes displaying a new virtual artifact, modifying a displayed virtual artifact, prompting a viewer of the MR experience to perform an action, displaying media content, etc. An MR procedure is composed of one or more MR steps to be sequentially executed. In various embodiments, an MR procedure demonstrates performance of a task to be performed by the viewer, prompts the viewer to perform the task, etc. In some embodiments, progression of the MR experience from a first MR step to a second MR step is triggered by an action taken by the viewer. In some embodiments, progression of the MR experience from the first MR step to the second MR step is triggered by a duration of time elapsed, a characteristic of a physical environment such as a weather condition, a sound condition, a light condition, a condition of one or more physical objects in the physical environment, etc.

At block 804, the facility generates a serialized representation including a hierarchy of tagged elements that includes a plurality of MR step elements. Schema used to generate a serialized representation of MR step elements are now discussed with respect to FIGS. 9A, 9B, and 9C.

Figure 9A:
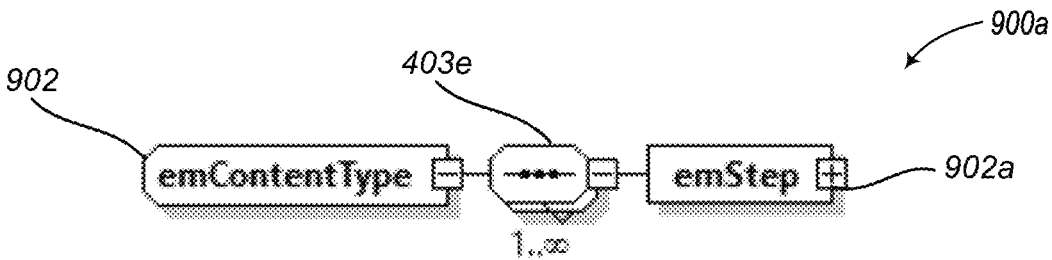
FIGS. 9A and 9B are schema diagrams showing schema used by the facility in some embodiments to serialize and deserialize step information for a mixed reality experience.
Figure 9B:
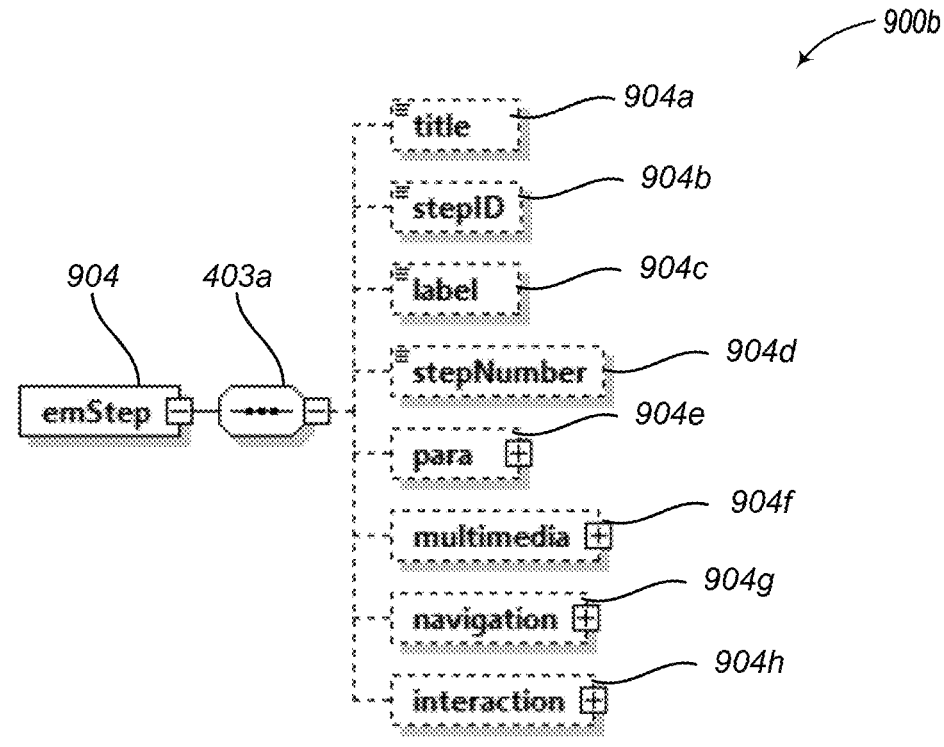

FIGS. 9A and 9B illustrate schema 900a and 900b, respectively, showing elements used by the facility in some embodiments to serialize and deserialize step information and function information for a mixed reality experience.

FIG. 9A is a schema diagram showing a schema 900a used by the facility in some embodiments to serialize and deserialize one or more MR steps for a mixed reality experience. Repeatable sequence of branches connector 403e establishes that for each instance of emContentType 902, at least one instance of emStep 902a is expected. Each instance of emStep 902a corresponds to an MR step. Accordingly, emContentype 902 corresponds to an MR procedure including at least one step.

FIG. 9B is a schema diagram showing a schema 900b that used by the facility in some embodiments to serialize and deserialize an MR step for a mixed reality experience. Sequence of branches connector 403a establishes that for each instance of emStep 904, zero or one instances are expected in the order shown of: title 904a, stepID 904b, label 904c, stepNumber 904d, para 904e, multimedia 904f, navigation 904g, and interaction 904h.

Title 904a defines a title for the MR step. StepID 904b defines an identifier for the MR step. In some embodiments, stepID 904b defines a unique identifier for the MR step among MR steps in the procedure or among MR steps in a plurality of procedures. Label 904c defines a label for the MR step. StepNumber 904d defines an MR step number for the MR step. In some embodiments, stepNumber 904d defines a unique MR step number among MR steps in the procedure of among MR steps in a plurality of procedures. Para 904e defines natural language to be displayed as text or presented as audio via text-to-speech or replay of an audio file during execution of the MR step. Multimedia 904f defines multimedia content and functionality for the MR step including zero or more images, videos, callouts, icons, 3D animations, or 3D models. Navigation 904g defines navigation functionality within the MR step including zero or more next buttons, previous buttons, replay buttons, or exit buttons. Interaction 904h defines interaction functionality in the MR step, including zero or more manual placement elements supporting manual placement of a virtual object in the MR step, button elements, audio triggers, dialogue-driven choices, image placements, or object placements.

Depending upon requirements or desired functionality of an MR step, any number of the above-discussed elements may be included in the serialized representation of the MR step. For example, an MR step that displays text on the screen may not include multimedia, navigation, or interaction elements.

Returning to FIG. 8, after block 804, process 800 proceeds to block 806, where the facility deserializes the serialized representation to generate a portion of a target experience to be graphically represented in an MR development tool.

As discussed herein, a portion of an MR experience may be created using a first platform, serialized into a serialized representation, and then deserialized into a target MR experience to be further modified. In the example shown in FIG. 8, the portion of the target MR experience is configured to be presented graphically in an MR development tool. For example, each MR step in the MR procedure may be presented as a node in a graph, wherein edges between the nodes indicate that the connected MR step nodes indicate that the connected MR steps are contiguous in the MR sequence. In various embodiments, the graph is a directed graph, a directed acyclic graph, an undirected graph, includes one or more directed edges or undirected edges, etc. In some embodiments, the MR development tool is a graphical programming environment. In some embodiments, the graphical presentation reflects a state of a file for a text-based programming language. After block 806, process 800 ends at an end block.

Figures 10A, 10B:
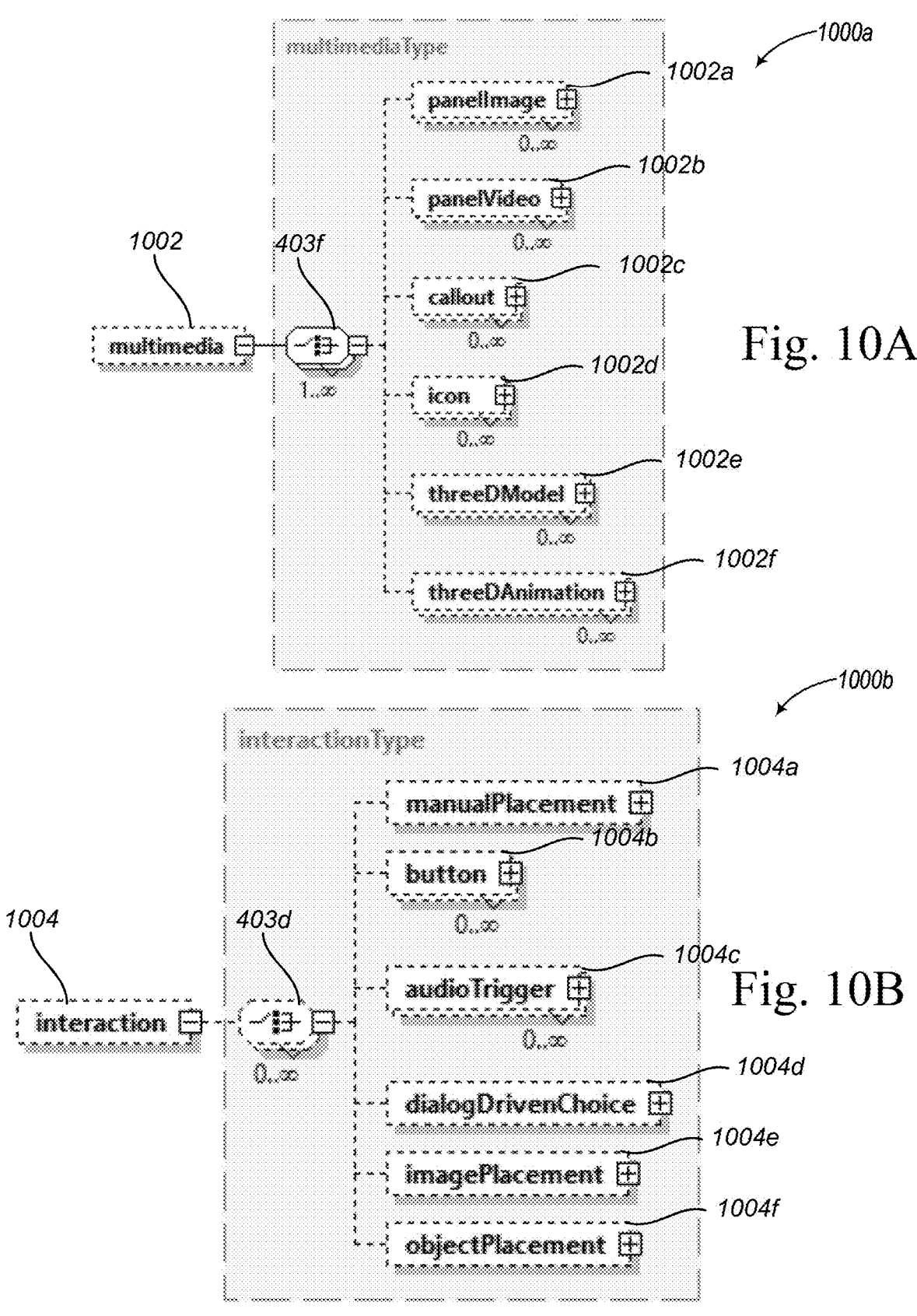
FIGS. 10A and 10B are schema diagrams showing schema used by the facility in some embodiments to serialize and deserialize multimedia information and interaction information for a mixed reality experience.

FIGS. 10A and 10B illustrate schema 1000*a* and 1000*b*, respectively, which show elements used by the facility in some embodiments to serialize and deserialize multimedia information and interaction information for an MR step in an MR experience.

The facility in various embodiments displays multimedia content in connection with an MR step in an MR experience. For example, in some embodiments, the facility displays an image or video in the MR experience. FIG. 10A is a schema diagram showing a schema 1000*a* used by the facility in some embodiments to serialize and deserialize a multimedia element such as multimedia 904*f* in FIG. 9. Repeatable choice of branches connector 403*f* establishes that for each instance of multimedia 1002, one of child elements 1002*a*, 1002*b*, 1002*c*, 1002*d*, 1002*e*, or 1002*f*, is present.

PanelImage 1002*a* defines properties for an image displayed on a panel in the MR experience. In various embodiments, panelImage 1002*a* includes elements defining a file name, file type, and zero or more of: assetName, defining a text reference name for the image; billboard, defining whether the text should be displayed facing the user; followUser, defining whether the text should follow the user; deviceSpace, defining a type of space and position for the text; mobility, defining translation, rotation, or scaling that may be applied to the text; or visibility, defining whether the text is to be visible in the MR experience.

PanelVideo 1002*b* defines properties for a video displayed on a panel in an MR experience. In various embodiments, panelVideo 1002*b* includes elements similar to embodiments of panelImage 1002*a*. In various embodiments, panelVideo 1002*b* includes an autoPlay element that defines an autoplay property of the video or a loop element that defines a loop property of the video.

Callout 1002*c* defines properties of callout for the MR experience. A callout is a display of text in the MR experience. Callout 1002*c* includes an element defining the text to be displayed and in various embodiments includes zero or more of elements: billboard, defining whether the text should be displayed facing the user; followUser, defining whether the text should follow the user; deviceSpace, defining a type of space and position for the text; mobility, defining translation, rotation, or scaling that may be applied to the text; or visibility, defining whether the text is to be visible in the MR experience.

Icon 1002*d* defines properties for an icon. An icon is an image to be displayed in the MR experience. In various embodiments, icon 1002*d* includes elements defining a file name and file type for the icon and zero or more of elements assetName, billboard, followUser, deviceSpace, mobility, or visibility.

ThreeDModel 1002*e* defines properties of a 3D model for the MR experience. In various embodiments, threeDModel 1002*e* includes elements defining a file name and file type, and zero or more of elements: assetName, mobility, visibility, or position.

ThreeDAnimation 1002*f* defines properties of a 3D animation for the MR experience. In various embodiments, threeDAnimation 1002*f* includes elements defining a file name and file type, and zero or more of elements: assetName, defining a reference name for the 3D animation; clipName, defining a name of a 3D animation clip; autoPlay; or loop, defining a looping behavior.

FIG. 10B is a schema diagram showing a schema 1000*b* used by the facility in some embodiments to serialize and deserialize an interaction element such as interaction 904*h* in FIG. 9. In general, an interaction element defines ways in which the facility enables viewer interaction with the MR experience. For example, the facility in some embodiments causes the MR experience to advance to a next MR step in response to receiving a voice command or button press by the viewer. Optional and repeatable choice of branches connector 403*d* establishes that for each instance of interaction 1004, zero or more of child elements 1004*a*, 1004*b*, 1004*c*, 1004*d*, 1004*e*, or 1004*f*, are present zero or more times.

ManualPlacement 1004*a* defines properties to manually place content in the MR experience. In various embodiments, manualPlacement 1004*a* includes an element defining an asset name and zero or more of elements: placementMethod, defining a method for placing the content; and voiceCommand, defining an auditory command to trigger the placement.

Button 1004*b* defines properties of a button used to interact with the MR experience. AudioTrigger 1004*c* defines properties of an audio command that triggers a function in the MR experience. DialogDrivenChoice 1004*d* defines properties of a dialog driven interaction containing a question and one or more answers. ImagePlacement 1004*e* defines properties of an image placement interaction in an MR experience. ObjectPlacement 1004*f* defines properties of an object placement interaction in an MR experience.

The facility in various embodiments uses schema 1000*a* and schema 1000*b* to serialize a source MR experience that includes one or more MR steps or one or more interactions, respectively, into a serialized representation. Similarly, the facility in various embodiments uses schema 1000*a* and schema 1000*b* to deserialize the serialized representation into a target MR experience.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, the method comprising:

obtaining a source mixed reality (MR) experience for a source platform;

generating, based on the source MR experience, a serialized representation including human-readable code, wherein the human-readable code comprises a hierarchy of tagged elements that comprises:

a schema version element;

a computer vision tracking element; and a virtual object placement element that has child elements comprising:

a position element that defines a position relative to an origin in the MR experience at which to place a virtual object, and a function element that defines a function to be applied to the MR experience in response to a placement of the virtual object; and deserializing the serialized representation, based on the schema version element, to generate a target MR experience for a target platform, wherein the target MR experience is usable to:

place the virtual object at the position relative to the origin in the target MR experience, execute the function in response to the placement, and track, based on the computer vision tracking element, a position relative to the origin of a camera coupled to an MR device displaying the target MR experience.

2. The method of claim 1, wherein the source platform is different from the target platform.

3. The method of claim 1, wherein the hierarchy of tagged elements includes a target MR devices element specifying compatible MR devices for the MR experience.

4. The method of claim 1, wherein the hierarchy of tagged elements includes a three-dimensional (3D) animation element specifying a 3D animation to apply to the virtual object and the 3D animation element has child elements including:

a file name element;

a file type element;

a clip name element;

an autoplay behavior element; and a loop behavior element.

5. The method of claim 1, wherein the source MR experience includes a representation of a node graph that includes nodes that represent MR steps in an MR procedure.

6. The method of claim 1, wherein the target MR experience is configured to be modified using an MR development tool that includes a graphical programming environment.

7. The method of claim 1, wherein the source MR experience is configured to be modified using an MR development tool that includes a graphical programming environment.

8. The method of claim 1, wherein deserializing the serialized representation comprises mapping each tagged element in the hierarchy of tagged elements to a target element in the target MR experience.

9. The method of claim 1, wherein the serialized representation is packaged with media assets that the serialized representation references.

10. The method of claim 1, wherein the serialized representation is packaged with a plurality of media assets that the serialized representation references and the serialized representation is configured to be modified using an MR development tool that includes a graphical programming environment.

11. The method of claim 1, wherein the target platform is an MR viewing software compatible with a plurality of MR device types.

12. The method of claim 1, wherein the target MR experience includes a functionality not included in the source MR experience.

13. The method of claim 1, wherein the hierarchy of tagged elements further includes an interaction element specifying a function to apply to the source MR experience in response to an action by a user, the interaction element having child elements including:

a button element;

an audio trigger element;

a dialog-driven choice element;

an image placement element; and an object placement element.

14. The method of claim 1, wherein the computer vision tracking element specifies to track a physical object to be displayed as coupled to the virtual object.

15. The method of claim 1, wherein the serialized representation is deserialized into a plurality of target MR experiences for a plurality of corresponding target platforms.

* * * * *